US010225881B2

(12) United States Patent
Sebire et al.

(10) Patent No.: US 10,225,881 B2
(45) Date of Patent: Mar. 5, 2019

(54) EXTENDED DISCONTINUOUS RECEPTION SIGNALING FOR CONNECTED MODE USER EQUIPMENTS

(71) Applicant: Nokia Solutions and Networks Oy, Espoo (FI)

(72) Inventors: Benoist Pierre Sebire, Tokyo (JP); Chunli Wu, Beijing (CN); Guillaume Decarreau, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/549,610

(22) PCT Filed: Mar. 11, 2015

(86) PCT No.: PCT/CN2015/073979
§ 371 (c)(1),
(2) Date: Aug. 8, 2017

(87) PCT Pub. No.: WO2016/141560
PCT Pub. Date: Sep. 15, 2016

(65) Prior Publication Data
US 2018/0042068 A1   Feb. 8, 2018

(51) Int. Cl.
*H04W 28/18*   (2009.01)
*H04W 76/28*   (2018.01)
(Continued)

(52) U.S. Cl.
CPC ........... *H04W 76/28* (2018.02); *H04W 28/18* (2013.01); *H04W 52/0216* (2013.01);
(Continued)

(58) Field of Classification Search
None
See application file for complete search history.

(56) References Cited

U.S. PATENT DOCUMENTS

| 7,016,771 B2 | 3/2006 | Watkins et al. |
| 8,837,313 B2 | 9/2014 | Adachi et al. |

(Continued)

FOREIGN PATENT DOCUMENTS

| CN | 101111051 A | 1/2008 |
| JP | 2010161772 A | 7/2010 |

(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321, V12.4.0, Dec. 2014, pp. 1-60.

(Continued)

*Primary Examiner* — Brian S Roberts
(74) *Attorney, Agent, or Firm* — Nokia Technologies Oy

(57) ABSTRACT

A user equipment uses extended discontinuous reception (DRX) when the user equipment is in connected mode with a communication network. The extended DRX comprises extended DRX cycles and offsets, which are based on a value of a specific DRX cycle. The user equipment receives (S31) signaling from the communication network, the signaling comprising an extended DRX cycle indication and offset value, calculates (S32) an extended DRX cycle from the extended DRX cycle indication and an offset from the offset value, using the value of the specific DRX cycle, and executes (S33) the DRX when the user equipment is in the connected mode with the extended DRX cycle calculated and the offset calculated.

20 Claims, 2 Drawing Sheets

(51) Int. Cl.
*H04W 52/02* (2009.01)
*H04W 84/04* (2009.01)
(52) U.S. Cl.
CPC ........... *H04W 84/042* (2013.01); *Y02D 70/00* (2018.01); *Y02D 70/20* (2018.01)

(56) References Cited

U.S. PATENT DOCUMENTS

| | | | |
|---|---|---|---|
| 9,900,928 B2* | 2/2018 | Wittberg | H04W 52/0216 |
| 2008/0186893 A1* | 8/2008 | Kolding | H04W 52/0235 370/311 |
| 2008/0268845 A1* | 10/2008 | Wu | H04W 76/28 455/436 |
| 2010/0184458 A1* | 7/2010 | Fodor | H04W 52/0216 455/522 |
| 2013/0294307 A1 | 11/2013 | Johansson et al. | |
| 2016/0044578 A1* | 2/2016 | Vajapeyam | H04W 52/0216 370/252 |
| 2016/0044605 A1* | 2/2016 | Vajapeyam | H04W 52/322 370/311 |
| 2016/0242231 A1* | 8/2016 | Vajapeyam | H04W 24/08 |

FOREIGN PATENT DOCUMENTS

| | | |
|---|---|---|
| JP | 2014079025 A | 5/2014 |
| RU | 2504905 C1 | 1/2014 |
| RU | 2518221 C2 | 6/2014 |
| WO | 2014/158268 A1 | 10/2014 |
| WO | 2014/175003 A1 | 10/2014 |
| WO | 2014/176883 A1 | 11/2014 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.4.1, Dec. 2014, pp. 1-410.

"New WI Proposal: RAN enhancements for extended DRX in LTE", 3GPP TSG RAN Meeting #66, RP-141994, Agenda Item: 14.1.2, Qualcomm Incorporated, Dec. 8-11, 2014, 7 pages.
"Motivation for RAN2 Rel-13 WID Proposal: RAN enhancements for Extended DRX in LTE", 3GPP RAN #66, RP-141992, Qualcomm, Dec. 8-11, 2014, 11 pages.
"New WI proposals: DRX Enhancements for LTE", 3GPP TSG RAN Meeting #66, RP-142049, Agenda Item: 14.1.2, Mediatek Inc, Dec. 9-11, 2014, 6 pages.
"DRX Enhancements for LTE Connected Mode Part Motivation", 3GPP TSG RAN#66, RP-142050, Agenda: 14.1.2, Mediatek Inc., Dec. 8-11, 2014, 7 pages.
International Search Report and Written Opinion received for corresponding Patent Cooperation Treaty Application No. PCT/CN2015/073979, dated Dec. 9, 2015, 11 pages.
Office action received for corresponding Russian Patent Application No. 2017133528, dated Aug. 28, 2018, 7 pages of office action and 1 page of translation available.
Extended European Search Report received for corresponding European Patent Application No. 15884243.5, dated Sep. 5, 2018, 7 pages.
"Discussion on DRX Offset Configuration", 3GPP TSG-RAN Working Group 2 meeting #63bis, R2-085323, Agenda: 11.1.3, CATT, Sep. 29-Oct. 3, 2008, pp. 1-3.
Office action received for corresponding esponding Japanese Patent Application No. 2017-547415, dated Oct. 9, 2018, 3 pages of office action and 3 pages of translation available.
"Evaluation of PSM and DRX", 3GPP TSG-RAN Working Group 2 meeting #89, R2-150280, Agenda: 11.2.1 Extended DRX mechanisms, Ericsson, Feb. 9-13, 2015, pp. 1-6.
"Discussion on Extended DRX Cycle Mechanism", 3GPP TSG-RAN Working Group 2 meeting #89, R2-150508, Agenda: 11.2.1, Huawei, Feb. 9-13, 2015, pp. 1-5.
"Device Power Saving Enhancements", 3GPP TSG-RAN Working Group 2 meeting #88, R2-144976, Agenda: 11.2 Study on Small data transmission enhancements for UMTS, Ericsson, Nov. 17-21, 2014, pp. 1-6.
"Some Consideration on Extended DRX Cycle Longer than Maximum SFN", 3GPP TSG-RAN Working Group 2 meeting #82, R2-131808, Agenda: 5.2.2, CATT, May 20-24, 2013, pp. 1-2.

* cited by examiner

EXTENDED DISCONTINUOUS RECEPTION SIGNALING FOR CONNECTED MODE USER EQUIPMENTS

RELATED APPLICATION

This application was originally filed as PCT Application No. PCT/CN2015/073979 filed Mar. 11, 2015.

BACKGROUND OF THE INVENTION

Field of the Invention

The present invention relates to extended discontinuous reception (DRX) signaling for connected mode user equipments (UEs).

Related Background Art

The following meanings for the abbreviations used in this specification apply:
C-RNTI Cell Radio Network Temporary Identifier
DRX Discontinuous Reception
LTE Long Term Evolution
PDCCH Physical Downlink Control Channel
RAN Radio Access Network
RRC Radio Resource Control
SIB System Information Block
UE User Equipment For UE energy saving purpose, DRX has been defined in LTE. If an UE is configured with DRX by higher layer, the UE is not required to monitor PDCCH when it is not in active time as show in FIG. 1. FIG. 1 illustrates a DRX cycle in which the UE monitors PDCCH during "On Duration" (active time), and does not monitor PDCCH during "Opportunity for DRX".

DRX is configured by RRC with the following parameters:

```
DRX-Config ::=              CHOICE {
    release                 NULL,
    setup                   SEQUENCE {
        onDurationTimer         ENUMERATED {
                                psf1,psf2, psf3, psf4, psf5, psf6,
                                psf8, psf10, psf20, psf30, psf40,
                                psf50, psf60, psf80, psf100,
                                psf200},
        drx-InactivityTimer     ENUMERATED {
                                psf1, psf2, psf3, psf4, psf5, psf6,
                                psf8, psf10, psf20, psf30, psf40,
                                psf50, psf60, psf80, psf100,
                                psf200, psf300, psf500, psf750,
                                psf1280, psf1920, psf2560,
                                spare10, spare9, spare8, spare7,
                                spare6, spare5, spare4, spare3,
                                spare2, spare1},
        drx-RetransmissionTimer ENUMERATED {
                                psf1, psf2, psf4, psf6, psf8, psf16,
                                psf24, psf33},
        longDRX-CycleStartOffset CHOICE {
            sf10                INTEGER(0..9),
            sf20                INTEGER(0..19),
            sf32                INTEGER(0..31),
            sf40                INTEGER(0..39),
            sf64                INTEGER(0..63),
            sf80                INTEGER(0..79),
            sf128               INTEGER(0..127),
            sf160               INTEGER(0..159),
            sf256               INTEGER(0..255),
            sf320               INTEGER(0..319),
            sf512               INTEGER(0..511),
            sf640               INTEGER(0..639),
            sf1024              INTEGER(0..1023),
            sf1280              INTEGER(0..1279),
            sf2048              INTEGER(0..2047),
            sf2560              INTEGER(0..2559)
        },
        shortDRX                SEQUENCE {
            shortDRX-Cycle          ENUMERATED {
                                    sf2, sf5, sf8, sf10, sf16, sf20,
                                    sf32, sf40, sf64, sf80, sf128, sf160,
                                    sf256, sf320, sf512, sf640},
            drxShortCycleTimer      INTEGER (1..16)
        } OPTIONAL                  -- Need OR
    }
}
-- ASN1STOP
```

The above parameter "longDRX-CycleStartOffset" comprises longDRX-Cycle and drxStartOffset. The value of longDRX-Cycle is in number of sub-frames. Value sf10 corresponds to 10 sub-frames, sf20 corresponds to 20 sub-frames and so on. If shortDRX-Cycle is configured, the value of longDRX-Cycle should be a multiple of the shortDRX-Cycle value. The value of drxStartOffset value is in number of sub-frames.

The above parameter "onDurationTimer" is a timer for DRX. Its value is in number of PDCCH sub-frames. Value psf1 corresponds to 1 PDCCH sub-frame, psf2 corresponds to 2 PDCCH sub-frames and so on.

The above parameter "drx-InactivityTimer" is a timer for DRX. Its value is in number of PDCCH sub-frames. Value psf1 corresponds to 1 PDCCH sub-frame, psf2 corresponds to 2 PDCCH sub-frames and so on.

The above parameter "drx-RetransmissionTimer" is a timer for DRX. Its value is in number of PDCCH sub-frames. Value psf1 corresponds to 1 PDCCH sub-frame, psf2 corresponds to 2 PDCCH sub-frames and so on.

The value of the above parameter "shortDRX-Cycle" is in number of sub-frames. Value sf2 corresponds to 2 sub-frames, sf5 corresponds to 5 subframes and so on.

The above parameter "drxShortCycleTimer" is a timer for DRX. Its value is in multiples of shortDRX-Cycle. A value of 1 corresponds to shortDRX-Cycle, a value of 2 corresponds to 2*shortDRX-Cycle and so on.

For power saving purposes, RAN is considering extending connected mode DRX way beyond the current maximum of 2560 ms, e.g. to one hour.

For example, in order to support a DRX cycle of one hour (3600 s or 3,600,000 ms), a straightforward extension of the current signaling would be to introduce as long DRX-CycleStartOffset parameter the following:

```
sf3600000               INTEGER(0..3599999)
```

Clearly, when introducing very large DRX cycles (or extended DRX), a 1 ms granularity is not needed to spread the UEs: the number of ms within a cycle is largely superior to the number of UEs that can be supported. For instance, only 65,536 C-RNTI can be allocated (16 bits long), which is to be compared to the 3,600,000 possible offsets in the example of the 1 hour DRX cycle above: ~100 times more offsets than required.

SUMMARY OF THE INVENTION

According to at least one embodiment of the invention, extended DRX is introduced with minimized signaling overhead and without compromising flexibility.

According to the present invention, methods, a user equipment, a network apparatus and a computer program product are provided as set out in the appended claims.

In the following the invention will be described by way of embodiments thereof with reference to the accompanying drawings.

DESCRIPTION OF THE EMBODIMENTS

Figure 1:
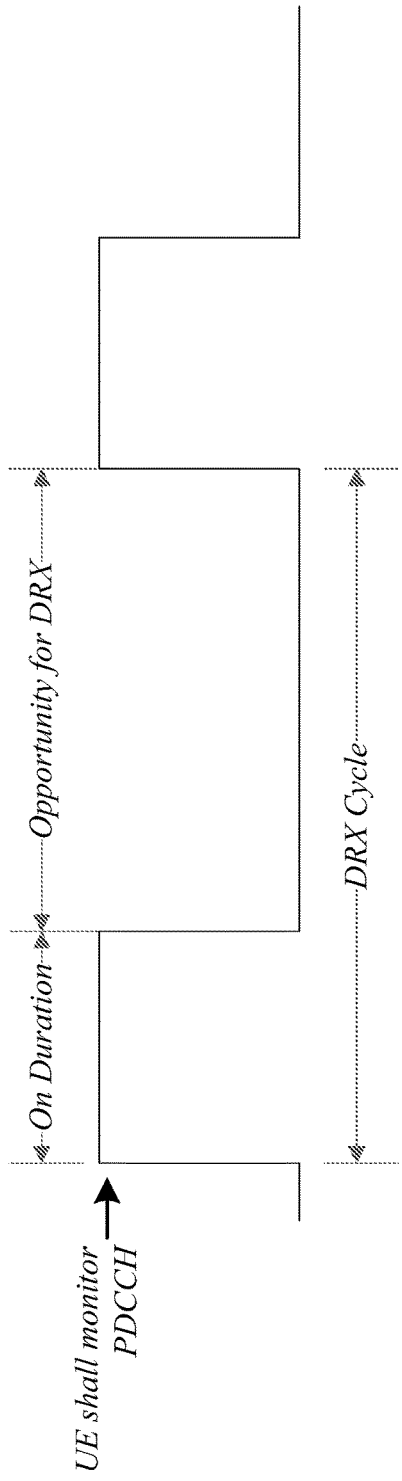
FIG. 1 shows a diagram illustrating a DRX cycle.
Figure 2:
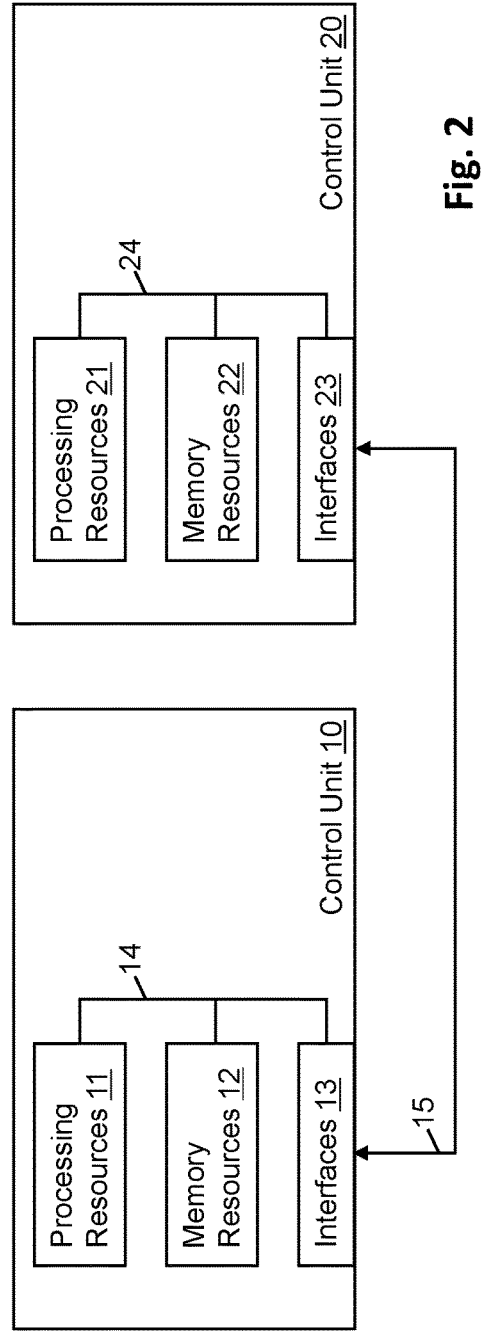
FIG. 2 shows a schematic block diagram illustrating a configuration of electronic devices in which examples of embodiments of the invention are implementable.

As a preliminary matter before exploring details of various implementations, reference is made to FIG. 2 for illustrating a simplified block diagram of a control unit 10 and a control unit 20 suitable for use in practicing the exemplary embodiments of this invention.

The control unit 10 may be part of and/or used by a user equipment. The control unit 10 comprises processing resources (e.g. processing circuitry) 11, memory resources (e.g. memory circuitry) 12 which may store a program, and interfaces (e.g. interface circuitry) 13, which are connected via a link 14. The interfaces 13 may comprise a suitable radio frequency (RF) transceiver (not shown) coupled to one or more antennas (not shown) for bidirectional wireless communications over one or more wireless links including a signaling link 15 with the control unit 20.

The control unit 20 may be part of and/or used by an apparatus of the communication network, e.g. an eNB. The control unit 20 comprises processing resources (e.g. processing circuitry) 21, memory resources (e.g. memory circuitry) 22 which may store a program, and interfaces (e.g. interface circuitry) 23, which are connected via a link 24. The interfaces 23 may comprise a suitable radio frequency (RF) transceiver (not shown) coupled to one or more antennas (not shown) for bidirectional wireless communications over one or more wireless links including the signaling link 15 with the control unit 10.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the programs stored in the memory resources 11 is assumed to include program instructions that, when executed by the associated processing resources 11, enable the electronic device to operate in accordance with the exemplary embodiments of this invention. Inherent in the processing resources 11 is a clock to enable synchronism among the various apparatus for transmissions and receptions within the appropriate time intervals and slots required, as the scheduling grants and the granted resources/sub-frames are time dependent. The transceivers include both transmitter and receiver, and inherent in each is a modulator/demodulator commonly known as a modem.

In general, the exemplary embodiments of this invention may be implemented by computer software stored in the memory resources 12 and executable by the processing resources 11 of the control unit 10, or by hardware, or by a combination of software and/or firmware and hardware in any or all of the devices shown.

In general, the various embodiments of a UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory resources 12, 22 may be of any type suitable to the local technical environment and may be implemented using any suitable data storage technology, such as semiconductor based memory devices, magnetic memory devices and systems, optical memory devices and systems, fixed memory and removable memory. The processing resources 11, 21 may be of any type suitable to the local technical environment, and may include one or more of general purpose computers, special purpose computers, microprocessors, digital signal processors (DSPs) and processors based on a multi core processor architecture, as non-limiting examples.

Figure 3:
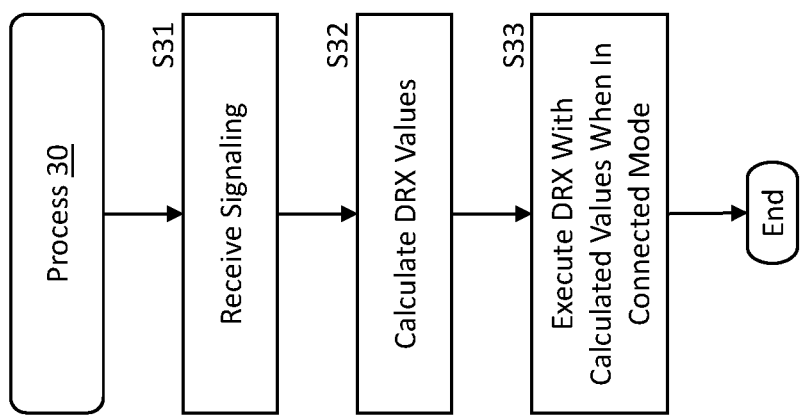
FIG. 3 shows a flowchart illustrating a process according to an embodiment of the invention.

Now reference is made to FIG. 3 illustrating a process 30 according to at least one embodiment of the invention.

The process 30 is for use in a UE accessing a communication network. The UE is configured to use DRX when it is in connected mode with the communication network. The extended DRX comprises extended DRX cycles and offsets, which are based on a value of a specific DRX cycle (e.g. 2560 ms).

In step S31, signaling from the communication network is received. The signaling comprises an extended DRX cycle indication and an offset value.

In step S32, an extended DRX cycle is calculated from the extended DRX cycle indication and an offset is calculated from the offset value, using the value of the specific DRX cycle.

In step S33, DRX is executed when the UE is in the connected mode, with the extended DRX cycle calculated and the offset calculated.

The value of the specific DRX cycle may be received from the communication network, or may be fixed e.g. to the maximum length of long DRX cycle (e.g. 2560 ms).

According to first and second embodiments of the invention, the extended DRX cycle indication received in step S31 indicates an extended DRX cycle ("longDRX-Cycle", "eDRX-CycleLength", as will be explained later on in more detail) and is a first multiplication value of the value of the specific DRX cycle. As an example, the DRX cycle corresponds to long DRX cycle (e.g. 2560 ms).

According to the first embodiment, the offset value received in step S31 indicates a DRX start offset ("drxStartOffset", as will be explained later on in more detail) and is a second multiplication value of the value of the specific DRX cycle, e.g. long DRX cycle.

According to the second embodiment of the invention, the offset value received in step S31 indicates an extended DRX cycle start offset ("eDRX-CycleStartOffset", as will be explained in more detail later on) and is a second multiplication value of the extended DRX cycle divided by the value of the specific DRX cycle, e.g. long DRX cycle.

In order to configure DRX cycles longer than the current maximum, i.e. extended DRX, according to an implementation example of the first embodiment of the invention, new values are introduced as multiple of the current maximum longDRX-Cycle, i.e. 2560 ms. Further, an offset granularity is defined as 2560 ms.

For instance, in order to introduce an extended DRX cycle of ~90 s:
- the DRX cycle (extended DRX cycle indication) is signaled as 35 (35×2560 ms=89600 ms), and
- the offset value is signaled as 0 . . . 34, where a value of 0 means no offset, 1 means an offset of 2560 ms, 2 means an offset of 5120 ms, and so on.

Alternatively, the basis (i.e. value of the specific DRX cycle) for DRX and offset calculation can be signaled instead of being fixed to the 2560 ms, as suggested above.

According to an implementation example of the second embodiment, new values are introduced for extended DRX length as multiple of the current maximum, i.e. 2560 ms. Further, an offset granularity is defined as the cycle length/2560 ms, and offset is defined as number of cycle length/2560 ms.

For instance, in order to introduce an extended DRX cycle of ~80 s:
- the DRX cycle (extended DRX cycle indication) is signaled as 32 (32×2560 ms=81920 ms) or 81920 sub-frames, and
- the offset value is signaled as 0 . . . 2559, with a granularity of 81920/2560=32 ms, where a value of 0 means no offset, 1 means an offset of 32 ms, 2 means an offset of 2×32 ms, and so on.

As described above for the first and second embodiments, the basis (i.e. value of specific DRX cycle) for DRX and offset calculation can be signaled instead of being fixed to the 2560 ms.

With the proposed introduction of extended DRX according to the first and second embodiments, signaling overhead can be minimized without compromising flexibility: enough offset is provided to spread UEs that support extended DRX while legacy UEs can still benefit from 1 ms granularity. Further, overlap between legacy UEs and UEs supporting extended DRX can be minimized.

Taking as an example an extended DRX cycle length up to 60 min defined as follows:
5 s (5120 ms=2×2560)
10 s (10240 ms=4×2560)
20 s (20480 ms=8×2560)
40 s (40960 ms=16×2560)
80 s (81920 ms=32×2560)
160 s (163840 ms=64×2560)
5 min (307200 ms=120×2560)
10 min (614400 ms=240×2560)
20 min (1228800 ms=480×2560)
30 min (1843200 ms=720×2560)
40 min (2457600 ms=960×2560)
50 min (3072000 ms=1200×2560)
60 min (3686400 ms=1440×2560)

For the first embodiment, the signaling is:

| | |
|---|---|
| extendedDRX-CycleStartOffset | CHOICE { |
| sf5120 | INTEGER(0..1), |
| sf10240 | INTEGER(0..3), |
| sf20480 | INTEGER(0..7), |
| sf40960 | INTEGER(0..15), |
| sf81920 | INTEGER(0..31), |
| sf163840 | INTEGER(0..63), |
| sf307200 | INTEGER(0..119), |
| sf614400 | INTEGER(0..239), |
| sf1228800 | INTEGER(0..479), |
| sf1843200 | INTEGER(0..719), |
| sf2457600 | INTEGER(0..959), |
| sf3072000 | INTEGER(0..1199), |
| sf3686400 | INTEGER(0..1439), |
| } | |

The above parameter "extendedDRX-CycleStartOffset" for extended DRX according to the first embodiment comprises longDRX-Cycle and drxStartOffset. The value of longDRX-Cycle is in number of sub-frames. Value sf5120 corresponds to 5120 sub-frames, sf10240 corresponds to 10240 sub-frames and so on. If shortDRX-Cycle is configured, the value of longDRX-Cycle should be a multiple of the shortDRX-Cycle value. The value of drxStartOffset value is in number of 2560 sub-frames.

For the second embodiment, the signaling is:

| | |
|---|---|
| eDRX-CycleLength | ENUMERATED { sf5120, sf10240, sf20480, sf40960, sf819200, sf163840, sf307200, sf614400, sf1228800, sf1843200, sf2457600, sf3072000, sf3686400, spare1, spare2} |
| eDRX-CycleStartOffset | INTEGER(0..2599) |

The above parameter "eDRX-CycleLength" for extended DRX according to the second embodiment is an extended DRX cycle. Its value is in number of sub-frames. Value sf5120 corresponds to 5120 sub-frames, sf10240 corresponds to 10240 subframes and so on.

The value of the above parameter "eDRX-CycleStartOffset" for extended DRX according to the second embodiment is number of eDRX-CycleLength/2560 subframes. Value 0 corresponds to 0 sub-frames, 1 corresponds to 1*eDRX-CycleLength/2560 sub-frames, 2 corresponds to 2*eDRX-CycleLength/2560 subframes and so on.

When calculating which subframe to wake up, the timing maintained in the UE based on SIB16 can be used with the formulation below:

if the Extended DRX Cycle is used and Timing modulo(eDRX-CycleLength)=eDRX-CycleStartOffset*eDRX-CycleLength/2560:

start onDurationTimer.

According to an aspect of the present invention, a user equipment is provided which may include and/or use the control unit 10 shown in FIG. 2. The user equipment accesses a communication network, using extended discontinuous reception (DRX) when the user equipment is in connected mode with the communication network. The extended DRX comprises extended DRX cycles and offsets, which are based on a value of a specific DRX cycle. The user equipment comprises means for receiving signaling from the communication network, the signaling comprising an extended DRX cycle indication and offset value, means for calculating an extended DRX cycle from the extended DRX cycle indication and an offset from the offset value, using the value of the specific DRX cycle, and means for executing the DRX when the user equipment is in the connected mode with the extended DRX cycle calculated and the offset calculated.

According to an embodiment of the invention, the means for receiving receive signaling from the communication network, the signaling comprising the value of the specific DRX cycle.

According to another embodiment of the invention, the value of the specific DRX cycle is the maximum length of long DRX cycle.

According to an implementation example of the invention, the means for receiving, calculating and executing are implemented by the processing resources 11, memory resources 12 and interfaces 13 of the control unit 10.

According to another aspect of the invention, an apparatus of a communication network, which may include and/or use the control unit 20 shown in FIG. 2 is provided. The apparatus comprises means for signaling an extended DRX cycle indication and offset value to a user equipment accessing the communication network, the user equipment using extended discontinuous reception (DRX) when the user equipment is in connected mode with the communication network, wherein the extended DRX comprises extended DRX cycles and offsets, which are based on a value of a specific DRX cycle.

According to an embodiment of the invention, the means for signaling signal the value of the specific DRX cycle to the user equipment.

According to an implementation example of the invention, the means for signaling are implemented by the processing resources 21, memory resources 22 and interfaces 23 of the control unit 20.

In the above aspects, according to an embodiment of the invention, the extended DRX cycle indication indicates an extended DRX cycle and is a first multiplication value of the value of the specific DRX cycle.

In the above aspects, according to an embodiment of the invention, the offset value indicates a DRX start offset and is a second multiplication value of the value of the specific DRX cycle.

In the above aspects, according to another embodiment of the invention, the offset value indicates an extended DRX cycle start offset and is a second multiplication value of the extended DRX cycle length divided by the value of the specific DRX cycle.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use in a user equipment, the user equipment using an extended discontinuous reception (DRX) when the user equipment is in a connected mode with a communication network, wherein the extended DRX comprises extended DRX cycles and offsets, which are based on a value of a specific DRX cycle, the method comprising:
receiving signaling from the communication network, the signaling comprising an extended DRX cycle indication and an offset value;
calculating an extended DRX cycle from the extended DRX cycle indication and an offset from the offset value, using the value of the specific DRX cycle; and
executing the DRX when the user equipment is in the connected mode with the extended DRX cycle calculated and the offset calculated.

2. The method of claim 1, comprising:
receiving signaling from the communication network, the signaling comprising the value of the specific DRX cycle.

3. The method of claim 1, wherein the value of the specific DRX cycle is the maximum length of a long DRX cycle.

4. The method of claim 3, wherein the long DRX cycle is 2560 milliseconds.

5. The method of claim 3, wherein a value of the long DRX cycle is in number of sub-frames.

6. The method of claim 1, wherein the extended DRX cycle indication indicates the extended DRX cycle and is a first multiplication value of the value of the specific DRX cycle.

7. The method of claim 1, wherein the offset value indicates a DRX start offset and is a second multiplication value of the value of the specific DRX cycle.

8. The method of claim 1, wherein the offset value indicates an extended DRX cycle start offset and is a second multiplication value of the extended DRX cycle length divided by the value of the specific DRX cycle.

9. The method of claim 1, wherein the communication network is a long term evolution network.

10. A non-transitory computer-readable medium encoded with instructions that, when executed by a computer, cause a user equipment to perform a method comprising:
using an extended discontinuous reception (DRX) when the user equipment is in a connected mode with a communication network, wherein the extended DRX comprises extended DRX cycles and offsets, which are based on a value of a specific DRX cycle;
receiving signaling from the communication network, the signaling comprising an extended DRX cycle indication and an offset value;
calculating an extended DRX cycle from the extended DRX cycle indication and an offset from the offset value, using the value of the specific DRX cycle; and
executing the DRX when the user equipment is in the connected mode with the extended DRX cycle calculated and the offset calculated.

11. An apparatus comprising at least one processor; and at least one memory including computer program code; the at least one memory and the computer program code configured to, with the at least one processor, cause the apparatus at least to:
use an extended discontinuous reception (DRX) when the apparatus is in a connected mode with a communication network, wherein the extended DRX comprises extended DRX cycles and offsets, which are based on a value of a specific DRX cycle;
receive signaling from the communication network, the signaling comprising an extended DRX cycle indication and an offset value;
calculate an extended DRX cycle from the extended DRX cycle indication and an offset from the offset value, using the value of the specific DRX cycle; and
execute the DRX when the apparatus is in the connected mode with the extended DRX cycle calculated and the offset calculated.

12. The apparatus of claim 11, wherein the at least one memory and the computer program code are further configured to, with the at least one processor, cause the apparatus at least to:
receive signaling from the communication network, the signaling comprising the value of the specific DRX cycle.

13. The apparatus of claim 11, wherein the value of the specific DRX cycle is the maximum length of a long DRX cycle.

14. The apparatus of claim 13, wherein the long DRX cycle is 2560 milliseconds.

15. The apparatus of claim 13, wherein a value of the long DRX cycle is in number of sub-frames.

16. The apparatus of claim 11, wherein the extended DRX cycle indication indicates the extended DRX cycle and is a first multiplication value of the value of the specific DRX cycle.

17. The apparatus of claim 11, wherein the offset value indicates a DRX start offset and is a second multiplication value of the value of the specific DRX cycle.

18. The apparatus of claim 11, wherein the offset value indicates an extended DRX cycle start offset and is a second multiplication value of the extended DRX cycle length divided by the value of the specific DRX cycle.

19. The apparatus of claim 11, wherein the apparatus is a user equipment.

20. The apparatus of claim 11, wherein the apparatus is for communicating in a long term evolution network.

* * * * *